(12) United States Patent
Yamamoto et al.

(10) Patent No.: US 7,382,404 B2
(45) Date of Patent: Jun. 3, 2008

(54) MONITORING CAMERA DEVICE CAPABLE OF ADJUSTING THE CHANGEOVER BETWEEN STANDARD TIME AND DAY LIGHT SAVING TIME

(75) Inventors: Shigeaki Yamamoto, Itami (JP); Masayoshi Okamoto, Daito (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 793 days.

(21) Appl. No.: 10/476,888

(22) PCT Filed: May 16, 2002

(86) PCT No.: PCT/JP02/04760

§ 371 (c)(1),
(2), (4) Date: Nov. 14, 2003

(65) Prior Publication Data

US 2004/0252207 A1 Dec. 16, 2004

(30) Foreign Application Priority Data

May 16, 2001 (JP) .............................. 2001-145899

(51) Int. Cl.
*H04N 5/76* (2006.01)
(52) U.S. Cl. ................. 348/231.2; 348/231.3; 348/231.5
(58) Field of Classification Search ................. 348/150, 348/231; 395/618, 182.13, 182.17; 382/305
See application file for complete search history.

(56) References Cited

U.S. PATENT DOCUMENTS 5,590,318 A * 12/1996 Zbikowski et al. ......... 707/202

(Continued)

FOREIGN PATENT DOCUMENTS

JP 7-98965 4/1995

(Continued)

OTHER PUBLICATIONS

Japanese Office Action "Notice of Reason for Refusal" dated Mar. 23, 2004.

*Primary Examiner*—Ngoc-Yen Vu
*Assistant Examiner*—Peter Chon
(74) *Attorney, Agent, or Firm*—Kratz, Quintos & Hanson, LLP.

(57) ABSTRACT

A monitoring camera device adds image capturing time data to image data which is successive with respect to time, and stores the image data on a recording medium. A plurality of directories are prepared on the recording medium for containing a predetermined number of items of image data, and are each named according to a directory naming rule, such that a portion of the name is made different when the directory is prepared during the period of standard time and when the directory is prepared during the period of daylight saving time. The directory also has attached thereto directory preparing time data indicating the time when the directory is prepared.

The camera device judges whether each of the directories is prepared during the period of the standard time or during the period of daylight saving time with reference to the name of the directory, and judges the order of directory preparing times using the time indicated by the directory preparing data of the directory when the directory is found to have been prepared during the period of the standard time, or using a value obtained by subtracting a time correction value from the time indicated by the directory preparing data of the directory when the directory is found to have been prepared during the period of daylight saving time.

6 Claims, 11 Drawing Sheets

U.S. PATENT DOCUMENTS 6,504,571 B1 * 1/2003 Narayanaswami et al. ....... 348/231.99
6,625,334 B1 * 9/2003 Shiota et al. ............... 382/305
7,116,353 B2 * 10/2006 Hobson et al. ............. 348/150

FOREIGN PATENT DOCUMENTS

| JP | 9-288684 | 11/1997 |
| JP | 10-271492 | 10/1998 |
| JP | 11-23744 | 1/1999 |
| JP | 11-110369 | 4/1999 |
| JP | 11-150700 | 6/1999 |
| JP | 2000-261794 | 9/2000 |
| JP | 2001-42072 | 2/2001 |

* cited by examiner

FIG. 2

```
            TIME SETTING (YEAR)      2 0 0 1

(MONTH)    0 3

(DAY)      2 5

(HOURS)    1 7

(MINUTES)  3 0
```

FIG. 3

```
           DAYLIGHT SAVING TIME SETTING

<START>      <END>

(MONTH)         4            10         <SETTING>

(CONDITIONS)  FIRST WEEK    LAST
                                            ┌─────┐
   (DAY OF THE WEEK)  SUN      SUN.         │ O N │
                                            └─────┘
                                              O F F
   (HOURS)         02           02
```

MONITORING CAMERA DEVICE CAPABLE OF ADJUSTING THE CHANGEOVER BETWEEN STANDARD TIME AND DAY LIGHT SAVING TIME

TECHNICAL FIELD

The present invention relates to surveillance or monitoring camera devices for recording still image data which is successive with respect to time along with image capturing time information, and more particularly to monitoring camera devices adapted for daylight saving time and to an image data management method for such monitoring camera devices.

BACKGROUND ART

Common surveillance or monitoring camera devices are systems comprising a digital still camera and having the function of continually capturing still images at intervals of a predetermined period of time. The still image data obtained is stored on a recording medium with image capturing time data added thereto. Useful as recording media are hard disks, optical disks, etc. of great capacity which are accessible randomly for storing still image data which is successive with respect to time. The monitoring camera device erases the image data of the oldest image capturing time when the quantity of image data stored approaches the capacity of the recording medium or the recording capacity set on the recording medium, in order to obviate the likelihood of the camera device becoming unable to capture images upon the quantity of still image data stored exceeding the capacity of the recording medium. This enables the camera device to continually capture still images at intervals of a predetermined period of time unless the user performs an ending manipulation.

The monitoring camera device has the same image capturing mechanism as common digital still cameras, and the still image data to be recorded is prepared according to a known data compressing method such as the JPEG method. The still image data obtained by capturing images is stored temporarily in a buffer memory within the camera device, and image capturing time data is added to the image data, which is then recorded on the recording medium successively. The camera device manages the image data with reference to the image capturing time data. The above-mentioned oldest image data is erased also with reference to the image capturing time. However, the data management with reference to the image capturing time data is likely to involve trouble due to the system of daylight saving time.

Daylight saving time is a system wherein timepieces are advanced by a predetermined period of time from the standard time during a specified period of from spring to fall. Daylight saving time is presently adopted by at least seventy countries. In the U.S., for example, the period of daylight saving time starts at 2 a.m. on the first Sunday of April and ends at 2 a.m. on the last Sunday of October, and during this period, timepieces are advanced by one hour. Stated more specifically with reference to FIG. 12, the period of daylight saving time in 2001 AD starts at 2 a.m. on the first Sunday of April, i.e., April 1. Accordingly, the time of day following April 1, 1:59 a.m. is not 2 a.m. but 3 a.m. The period of daylight saving time ends at 2 a.m. on the last Sunday of October, i.e., October 28. The time of day following October 28, 1:59 a.m. is not 2 a.m. but returns to 1 a.m.

Monitoring camera devices comprise a timepiece adapted for daylight saving time and are given image capturing time data by the timepiece. During the period of daylight saving time, the timepiece adapted for this system calculates daylight saving time by adding a predetermined time correction value to the standard time. Such a timepiece needs to have set therein information serving to provide a basis for judging whether the current time is within the period of daylight saving time. Generally provided as this information are conditions for a transition from the standard time to daylight saving time (hereinafter referred to as "DST transition conditions") which are determined for each year and which comprise the starting time and ending time of the period of daylight saving time. In the case of the U.S. in 2001 AD shown in FIG. 12, determined as the DST transition conditions are "the first Sunday ($1^{st}$)of April, 2 a.m." as the starting time of the period of daylight saving time and "the last Sunday ($28^{th}$) of October, 2 a.m." as the ending time of the period. The starting time is expressed in the standard time, and the ending time in daylight saving time.

The surveillance or monitoring camera device is intended for surveillance or monitoring, and successively and continually records image data at intervals of a predetermined period of time, so that image capturing time data for giving information as to the image capturing time or times is important. By erasing the oldest data from the recorded image data, the monitoring camera device is capable of continually capturing still images at intervals of a predetermined period of time and recording the images obtained. Accordingly, the image capturing time data needs to be added to the image data in corresponding relation with the image capturing order. No problem will arise if the system of daylight saving time is not adopted. If the image capturing time data according to the standard time is added to the image data, the image capturing order of the image data can be recognized by reference to the image capturing time data. However, in the case where the system of daylight saving time is adopted, problems will arise because when daylight saving time is changed over to the standard time, a situation will occur wherein time reverts.

With reference to the case of the U.S. shown in FIG. 12 as an example, at the current time of October 28, 2 a.m. in daylight saving time, the time of day output by timepieces returns to the standard time from daylight saving time. The time of day in the standard time is then October 28, 1 a.m. Thus the change of summer time to the standard time involves a lap of time zones (after 1 a.m. and before 2 a.m.).

If times lap which are indicated by the items of image capturing time data corresponding respectively to an item of image data and another item of image data which are obtained by the monitoring camera device, it is impossible to recognize the order of image capturing times corresponding to the respective items of image data. This gives rise to the problem that the monitoring camera device is unable to continue to capture and record images by erasing the oldest data from the recorded image data.

The present invention provides a monitoring camera device which is adapted to continually and successively capture and record images by recognizing the order of image capturing times corresponding to stored image data and erasing old image data, even if a lap of times occurs due to a changeover from daylight saving time to the standard time, and an image data management method for the monitoring camera device.

DISCLOSURE OF THE INVENTION

The present invention provides a monitoring camera device wherein image capturing time data is added to image data which is successive with respect to time, and the image data is stored on a recording medium. The monitoring camera device is characterized in that a plurality of directories are prepared on the recording medium for containing a predetermined number of items of image data, each of the directories being given a name according to a directory naming rule, a portion of the name being different when the directory is prepared during the period of standard time and when the directory is prepared during the period of daylight saving time.

In the monitoring camera device of the invention, each of the directories has attached thereto directory preparing time data indicating the time when the directory is prepared.

The monitoring camera device of the invention comprises means for judging whether each of the directories is prepared during the period of the standard time or during the period of daylight saving time with reference to the name of the directory, and judging the order of directory preparing times using the time indicated by the directory preparing data of the directory when the directory is found to have been prepared during the period of the standard time, or using a value obtained by subtracting a time correction value from the time indicated by the directory preparing data of the directory when the directory is found to have been prepared during the period of daylight saving time.

The monitoring camera device of the invention captures and records images while erasing the directory prepared earliest with reference to the result of judging the directory preparing time order.

The present invention provides an image data management method for a monitoring camera device for continually capturing and recording images by preparing a plurality of directories on a recording medium, adding image capturing time data to image data which is successive with respective to time and storing the image data under the directories. The image data management method comprises the steps of: preparing directories each having a name given thereto and directory preparing time data attached thereto and indicating the time when the directory is prepared, a portion of the name being different when the directory is prepared during the period of standard time and when the directory is prepared during the period of daylight saving time; judging whether each of the directories is prepared during the period of the standard time or during the period of daylight saving time with reference to the name of the directory; judging the order of directory preparing times using the time indicated by the directory preparing data of the directory when the directory is found to have been prepared during the period of the standard time, or using a value obtained by subtracting a time correction value from the time indicated by the directory preparing data of the directory when the directory is found to have been prepared during the period of daylight saving time; and erasing the directory prepared earliest along with the image data under the earliest directory with reference to the result of judging the directory preparing time order in the case where the number of directors has reached an upper limit value.

According to the present invention, the directory naming rule is so prescribed that a portion of the name of the directory is made different when the directory is prepared during the period of standard time and when the directory is prepared during the period of daylight saving time. Therefore, even if image capturing time data is provided in conformity with the system of daylight saving time, the order of image capturing times of the image data can be recognized with reference to the names of the directories. The directory which is prepared earliest is erased along with the image data under this directory, whereby a recording area is made available for the image data to be stored anew. This ensures a continual image capturing and recording operation.

BRIEF DESCRIPTION OF THE DRAWINGS

FIG. 2 is a diagram showing a representation on the display screen of a monitor when a time of day is set;

FIG. 3 is a diagram showing a representation on the display screen of the monitor when the DST transition conditions are set;

BEST MODE OF CARRYING OUT THE INVENTION

Figure 12:
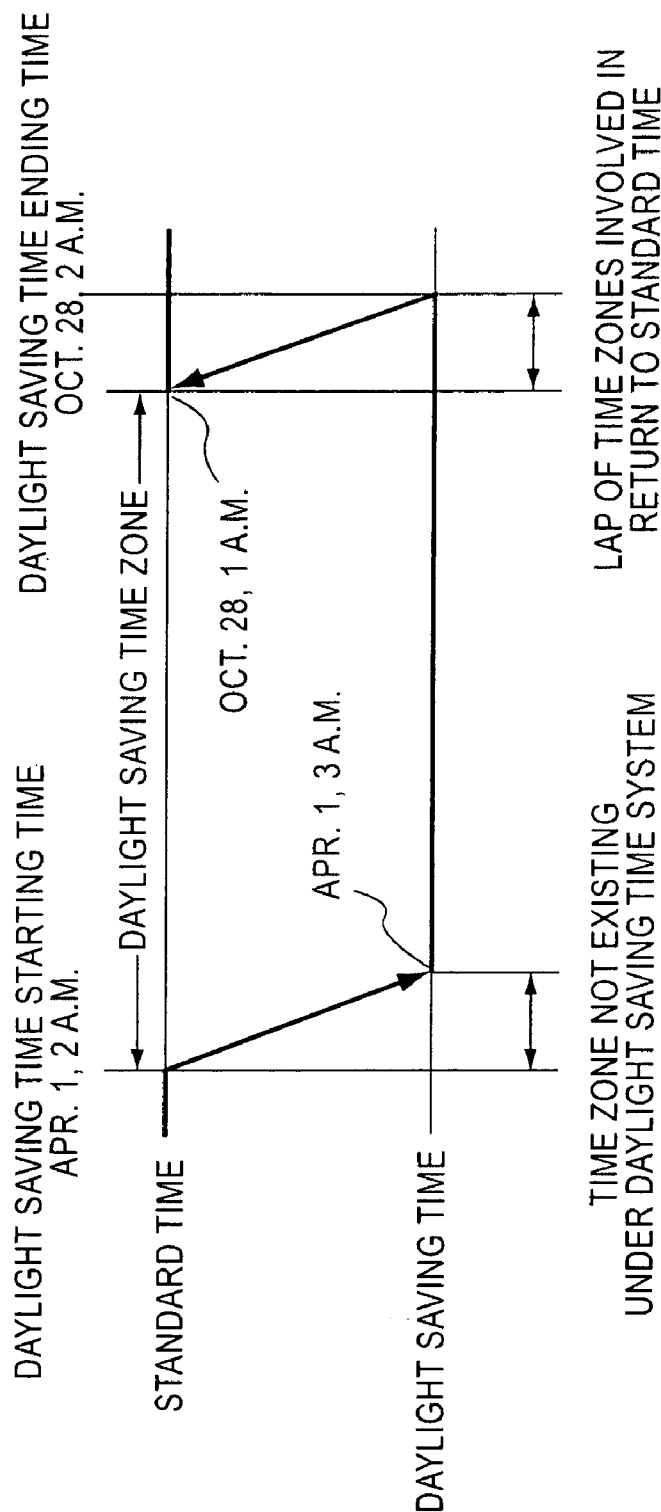
FIG. 12 is a diagram for illustrating a system of daylight saving time.

An embodiment of the present invention will be described below in detail with reference to the drawings. A system of daylight saving time will be described with reference to the case of the U.S. in 2001 shown in FIG. 12.

Figure 1:
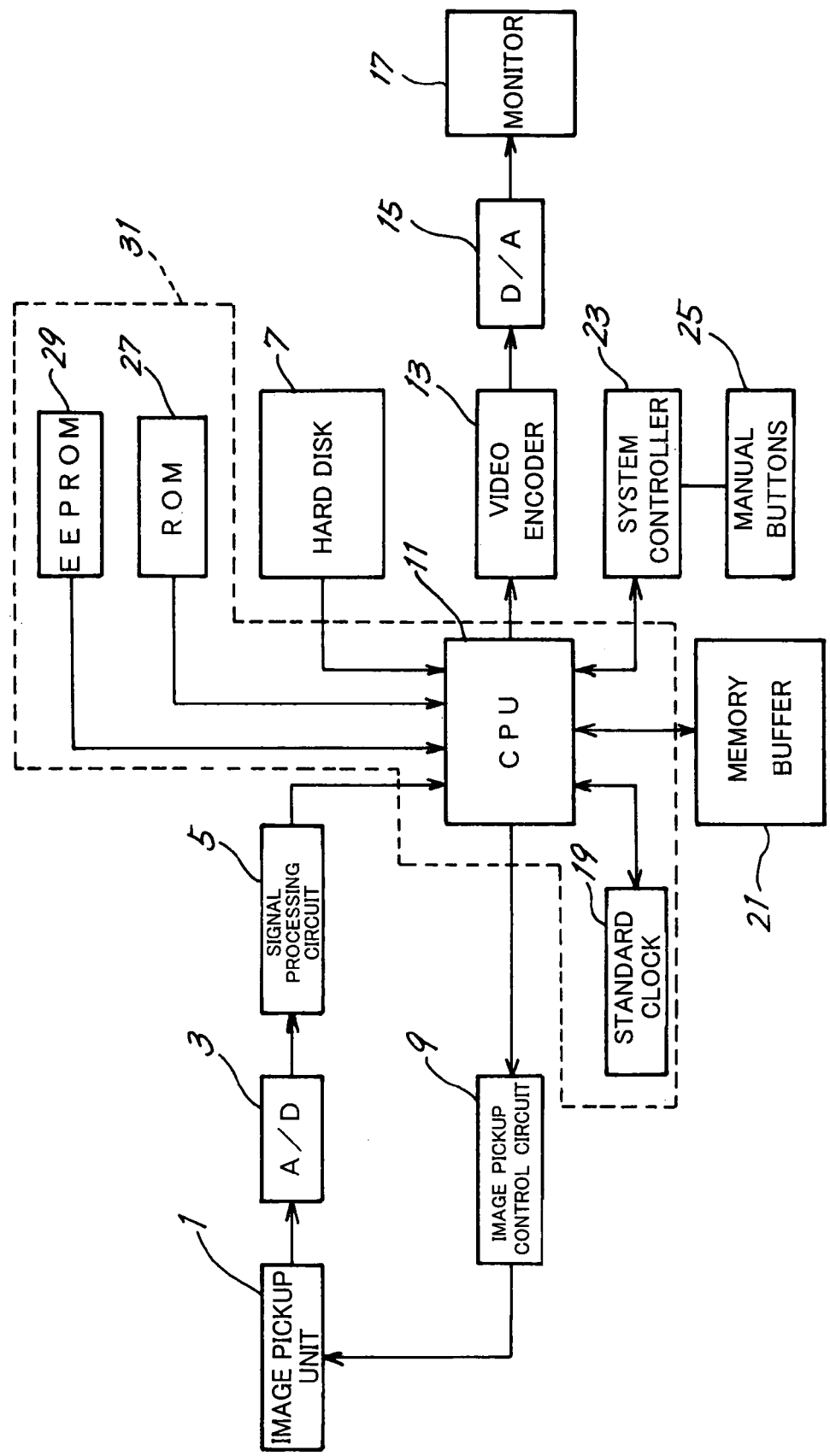
FIG. 1 is a block diagram of a monitoring camera device embodying the invention.

FIG. 1 is a block diagram of an embodiment of the invention, i.e., a monitoring camera device. This camera device comprises a timepiece 31 adapted for daylight saving time. An image pickup unit 1 comprises an optical lens, diagram mechanism and solid image pickup element such as CCD. The image pickup unit 1 is controlled by an image pickup control circuit 9 which is operable in response to a control signal from a CPU 11. An A/D converter 3 converts an analog image signal input from the image pickup unit 1 to a digital image signal. The digital image signal is processed by a signal processing circuit 5 for color separation, gamma correction, white balance adjustment, etc. The resulting digital image data is compressed by the CPU 11 and stored in a memory buffer 21 as compressed data. According to the present embodiment, the image data is compressed by the JPEG method. CPU 11 performs calculations of daylight saving time, processing based on the DST transition conditions, etc. Connected to the CPU 11 are a ROM 27 having stored therein programs prescribing the processing to be executed by the CPU 11, and EEPROM 29 having the DST transition conditions. The CPU 11, ROM 27 and EEPROM 29 constitute the timepiece 31 along with a standard clock 19 for outputting standard time data. The standard clock 19 delivers standard time data to the CPU 11 in a predetermined cycle at all times.

The compressed image data stored in the memory buffer 21 has attached thereto, as subinformation, image capturing time data output from the CPU 11 when images are captured. The compressed image data is stored via the CPU 11 on a hard disk 7 which is a recording medium randomly accessible. The CPU 11 processes the compressed image data on the hard disk 7 for the expansion of the data when the compressed data is to be reproduced in the initial form. A video encoder 13 adds a synchronizing signal and color burst signal to the digital image signal resulting from expansion of the data. The image signal is thereafter converted to an analog image signal by a D/A converter 15. A monitor 17 displays images based on the analog image signal. The monitor 17 serves also as a display for indicating to the user various settings, especially settings of times of day and the DST transition conditions.

A system controller 23 controls the CPU 11 in response to the manipulation of manual buttons 25. When suitably manipulated, manual buttons 25 set the timepiece 31 in a time setting mode. In the time setting mode, particulars about a time setting are presented on the screen of the monitor 17 as shown in FIG. 2. While watching the monitor 17, the user manipulates manual buttons 25 to input year, month, day, hours and minutes. These items are entered by manipulating numeral buttons, decision button, cancel button, etc. included among the manual buttons 25. In place of or in addition to the numeral buttons, the manual buttons 25 include a cross button for moving a cursor on the screen and an up-down button for increasing or decreasing a number on the screen. Items may be entered using these buttons. When a time is set, the timepiece 31 starts to count time at the set time.

When the timepiece 31 is set in a daylight saving time setting mode by manipulating manual buttons 25, particulars about a daylight saving time setting are presented on the screen of the monitor 17 as shown in FIG. 3. While watching the monitor 17, the user enters the starting time and ending time of daylight saving time by manipulating manual buttons 25. In the daylight saving time setting mode, it is possible to determine whether the DST transition conditions set are valid. When the setting of DST transition conditions is made "off," the timepiece 31 outputs standard time even during the period of daylight saving time. In the state shown in FIG. 3, the DST transition conditions are "on," the daylight saving time starting time is set on the first Sunday of April at 2 a.m. as expressed in the standard time, and the daylight saving time ending time is set on the last Sunday of October at 2 a.m. as expressed in daylight saving time.

As previously described, data as to the year is set in the time setting mode. In the case shown in FIG. 2, "2001" is set as year data. In the daylight saving time setting mode, the dates of the daylight saving time starting time and ending time are not shown in numerical values. With reference to the year data, and data as to the calendar for tens of years stored in the ROM 27, the CPU 11 calculates that the first Sunday of April is April 1, and that the last Sunday of October is October 28. The calculated items of data as to the daylight saving time starting time and ending time are stored in the EEPROM 29.

Figure 4:
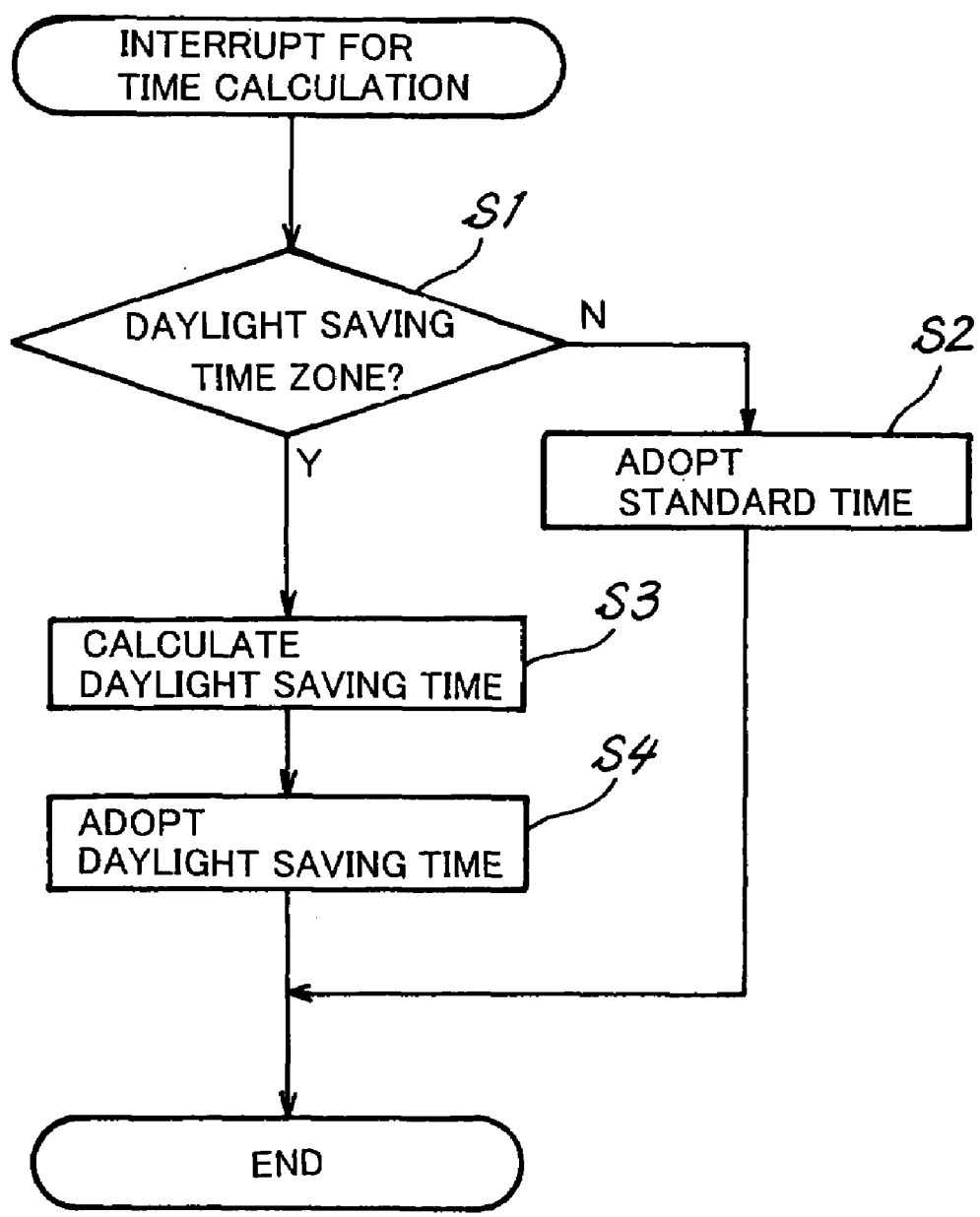
FIG. 4 is a flow chart showing an operation of a timepiece according to the invention.

Next, the time calculating operation of the timepiece 31 will be described with reference to FIG. 4, with attention directed mainly to the processing to be performed by the CPU 11. The CPU 11 calculates time as interrupt processing at intervals of a predetermined period of time, every time an image is captured, every time compressed image data is stored on the hard disk 7, and every time a directory as to compressed image data to be stored is prepared on the hard disk 7. In the beginning, standard time data output from the standard clock 19 is fed to the CPU 11, which in turn inquires whether the standard time indicated by the data is included in the daylight saving time zone (S1). The term "daylight saving time zone" refers to the daylight saving time starting time and the subsequent time zone before the daylight saving time ending time, as expressed in the standard time (not inclusive of the ending time). In the illustrated case of FIG. 12, the daylight saving time starting time according to the standard time is April 1, 2 a.m., and the daylight saving time ending time according to the standard time is October 28, 1 a.m. The CPU 11 inquires whether the standard time indicated by the data is included in the time zone of from April 1, 2 a.m. to October 28, 0:59:59 a.m. When the answer is negative, the timepiece 31 adopts the standard time data output by the standard clock 19 as it is as calculated time data (S2). The time data output from the timepiece when an image is captured is added to the image data or display data on the monitor 17 as image capturing time data. The time data output from the timepiece 31 when a directory is prepared as to the compressed image data is added to the directory as directory preparing time data.

When the answer to the inquiry of step S1 is affirmative, the CPU 11 adds a time correction value for use during the period of daylight saving time to the standard time to calculate daylight saving time, and outputs daylight saving time data indicating the daylight saving time (S3). The time correction value for use during the period of daylight saving time refers to the time difference value between the standard time and daylight saving time. In the illustrated case of FIG. 12, the time correction value is 1 hour. The timepiece adopts the daylight saving time data as the calculating time data (S4) As in the previous case, the time data is used as image capturing time data and directory preparing time data.

Figure 5A:
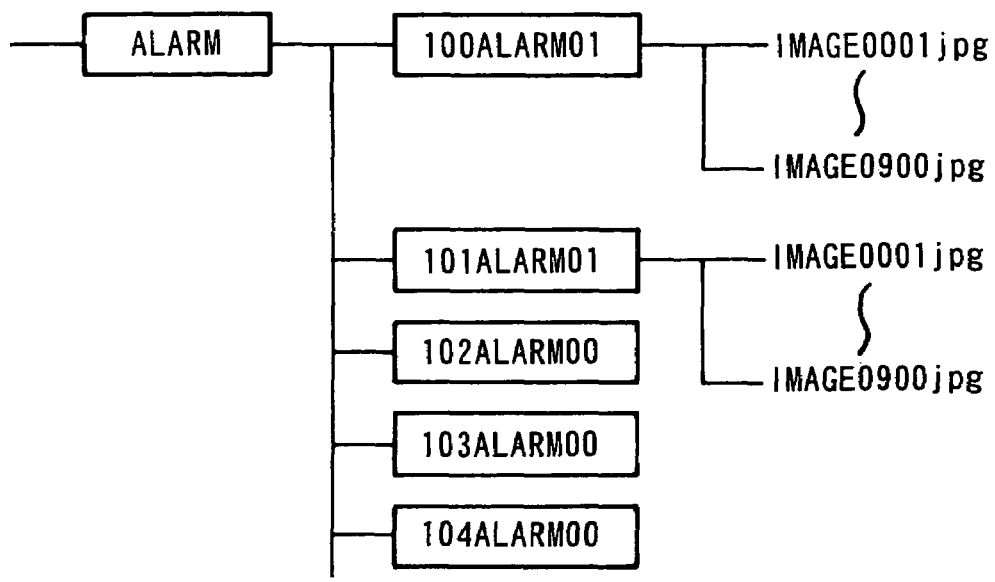
FIG. 5A is a diagram for illustrating data structure on a hard disk for use in the monitoring camera device embodying the invention.

In a usual recording mode, the monitoring camera device continues to capture still images at intervals of a predetermined period of time, and the images obtained are successively recorded on the hard disk. FIG. 5 shows the logic data structure of the hard disk 7 for use as a recording medium in the usual recording mode. Positioned below the root directory is a first directory named "ALARM", below which there are second directories ("100ALARM01," "101ALARM01," etc.) containing the compressed image data obtained by image capturing. With reference to FIG. 5(A), the second directories contain JPEG files in units of 900 files. The compressed image data is given file names according to a specified naming rule, and the last four characters in the file names (IMAGE0001-0900 are consecutive numbers given according to the image recording order. The second directories are similar in the names given to the image files. Accordingly, compressed image data having the same file name is included in each directory. According to the present embodiment, the camera device captures and records images at a rate of 3 fps (frames per second), i.e., three frames per second, so that compressed image data obtained for a monitoring period of 5 minutes is contained in each second directory.

The camera device performs compressed image data management in units of second directories. As previously described, each secondary directory has directory preparing time data added thereto. When the quantity of compressed image data stored on the hard disk 7 is about to exceed a predetermined upper limit in the usual recording mode, the camera device erases the second directory prepared earliest and the whole compressed image data in this second directory. This provides on the hard disk 7 a data recording area for storing compressed image data obtained anew.

According to the present embodiment, the quantity of compressed image data to be stored on the hard disk 7 in the usual recording mode is restricted to an upper limit which is a quantity corresponding to 60 minutes in terms of monitoring time period. Since there are 900 compressed image files in each second directory, this quantity of data corresponds to 12 second directories. The timing with which the erasure of the second directory prepared earliest (the oldest second directory) starts is set at the time when the first item of compressed image data starts in the latest 12th second directory. When compressed image data is to be placed into the 12th second directory, the oldest second directory and all the compressed image data contained therein have been erased. Since this procedure is repeated, there is no likelihood that the quantity of compressed image data stored on the hard disk 7 will exceed the upper limit value.

With the camera device of the present invention, the second directory for containing compressed image data is named according to the following rule. The first portion of the name of second directory is in the form of a number. In the case where a new second directory is to be prepared on the hard disk 7, the name to be given to the new second directory is made by adding the FIG. 1 to the first portion of the name of the second directory having the latest directory preparing time data (the directory wherein compressed image data is placed immediately before the current time). In the case of the data structure shown in FIG. 5, the second directory preparing time goes on from above downward. Thus, the first three characters of the names of second directories read "100," "101," "102," ... "111," as time goes on. The three figures in the first portions are used in circulation or repeatedly. There is an upper limit value for the number represented by these figures which value is dependent on the predetermined recording capacity. When a second directory is prepared which has first three characters representing the upper limit value, the number represented by the first three characters in the name of the second directory to be prepared next has the smallest value. In the case of the present embodiment, prepared subsequently to the second directory named with the first three characters of "111" is the second directory named with "100" again.

Figure 5B:
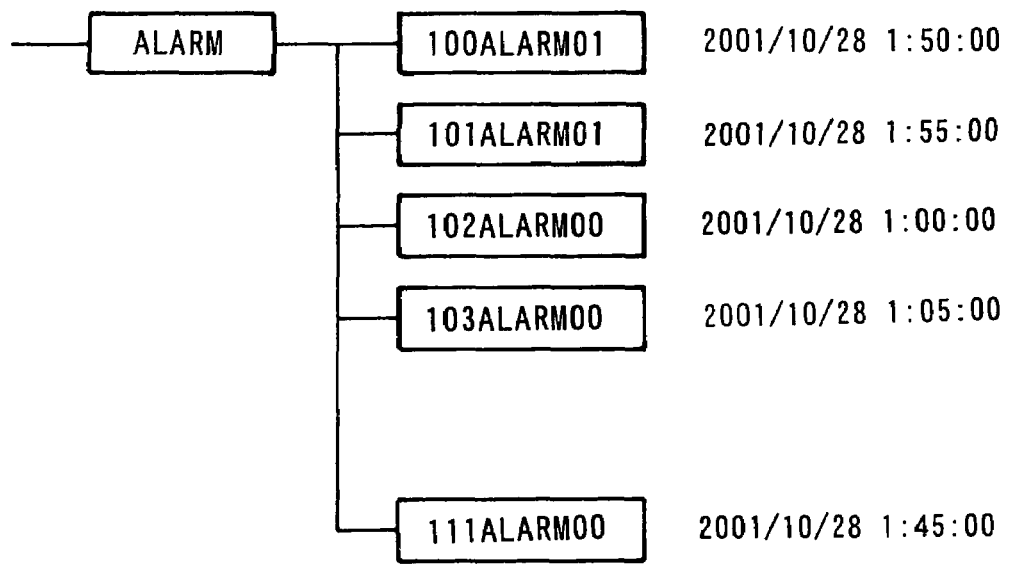
FIG. 5B is a diagram for illustrating directories prepared on the hard disk for use in the monitoring camera device embodying the invention and directory preparing time data.

The rear portion of the name of the second directory also has figures. This portion of the name of a second directory prepared during the period of the standard time differs from the corresponding portion of the name of a second directory prepared during the period of daylight saving time in figures. In other words, different figures are used for this portion when the directory preparing time of the second directory is the standard time and when the preparing time is daylight saving time. With reference to FIG. 5B, the years, months, days, hours, minutes and seconds given at the right of second directories are times indicating by the preparing time data of the respective second directories. (Like image capturing time data is added also to the compressed image data files shown at the right side of the FIG. 5A.) In the case of the data structure shown in FIG. 5B, the first two second directories are prepared during the period of daylight saving time, and the last two characters of the name of each of these directories are "01." The other second directories are prepared during the period of the standard time, and the last two characters of the name of each of these directories are "00."

Next, the image data recording operation of the monitoring camera device of the present embodiment will be described with reference to the flow chart of FIGS. 6 to 11. The camera device has installed in the CPU 11 a real time OS capable of performing a multitask processing. Accordingly, the image pickup processing with use of the image pickup unit 1, the storage processing of compressed image data on the hard disk 7 and erasure processing of the compressed image data are performed concurrently. Thus, even during processing for the erasure of compressed image data, feeding of digital image data to the CPU 11, image processing and compression processing for digital image data by the CPU 11, and the processing for storing the resulting compressed image data in the memory buffer are conducted.

Figure 6:
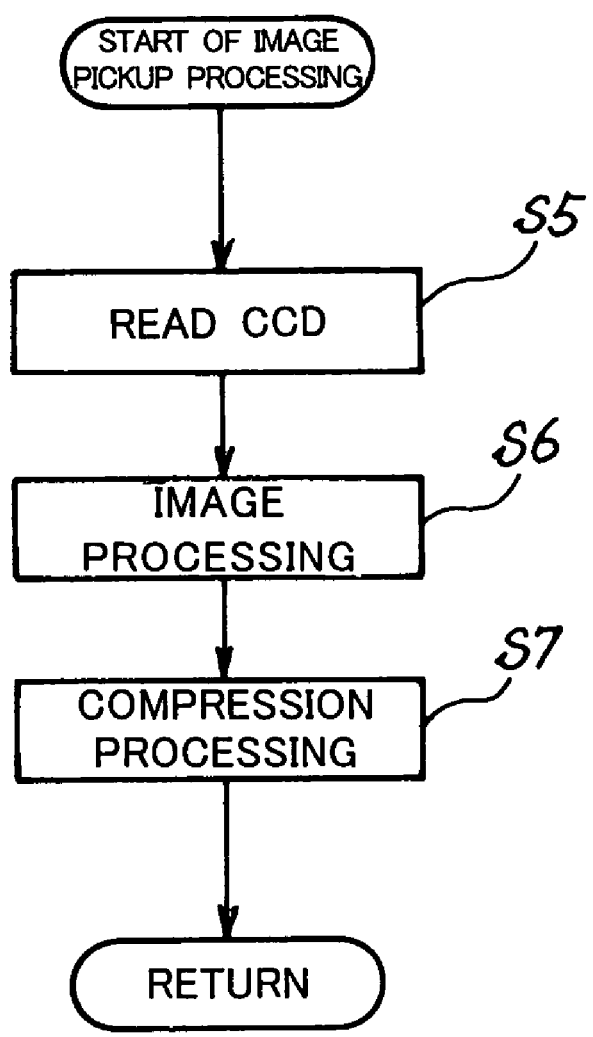
FIG. 6 is a flow chart showing image processing of the monitoring camera device embodying the invention.

FIG. 6 is a flow chart showing image pickup processing using the image pickup unit 1. When image pickup processing is started, analog image data is read from the solid image pickup element, such as CCD, provided in the unit 1 (S5). The analog image signal is converted to digital image data, which is subjected to image processing by the signal processing circuit 5 for color separation, gamma correction and white balance adjustment (S6). The digital image data processed is further processed for compression by CPU 11 according to the JPEG method, and the compressed image data is then stored in the memory buffer 21 (S7). In the usual recording mode, the above procedure is repeated at a predetermined frame rate, i.e., at 3 fps according to the present embodiment.

Figure 7:
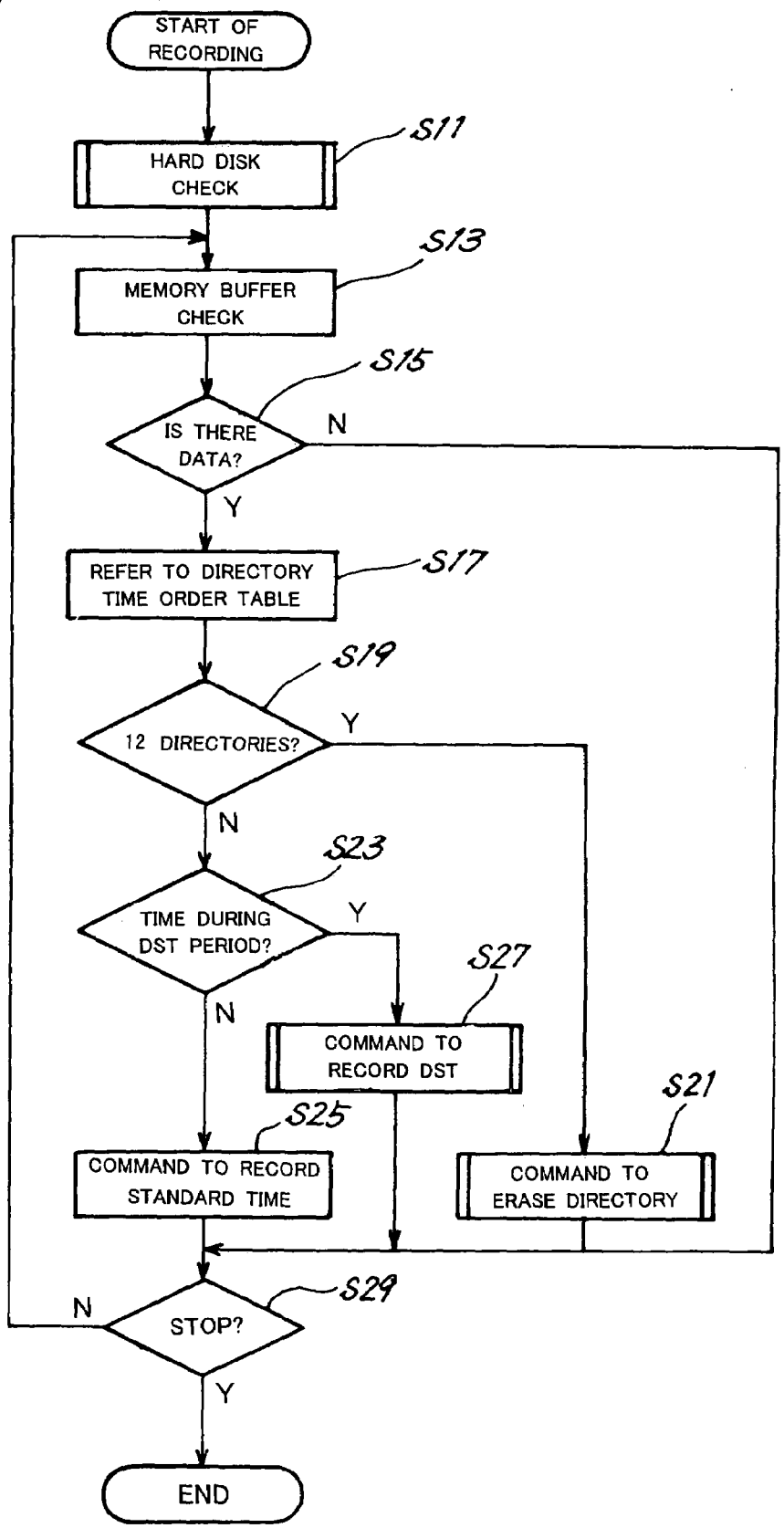
FIG. 7 is a flow chart showing a hard disk recording procedure of the monitoring camera device embodying the invention.

FIG. 7 is a flow chart showing a procedure for storing the compressed image data on the hard disk 7 in the usual recording mode. The user gives a command to start image recording in the usual recording mode to the CPU 11 via the system controller 23 by depressing manual buttons 25, whereupon the second directories already prepared on the hard disk 7 are checked (S11). The subsequent steps will be described later. Incidentally, the image pickup processing is effected in preference to the procedure shown in FIG. 7. Stated more specifically, the storage of the compressed image data on the hard disk 7 to be described later is performed during a period other than the period of operation of the CPU 11 for executing the image pickup processing of FIG. 6.

Figure 8:
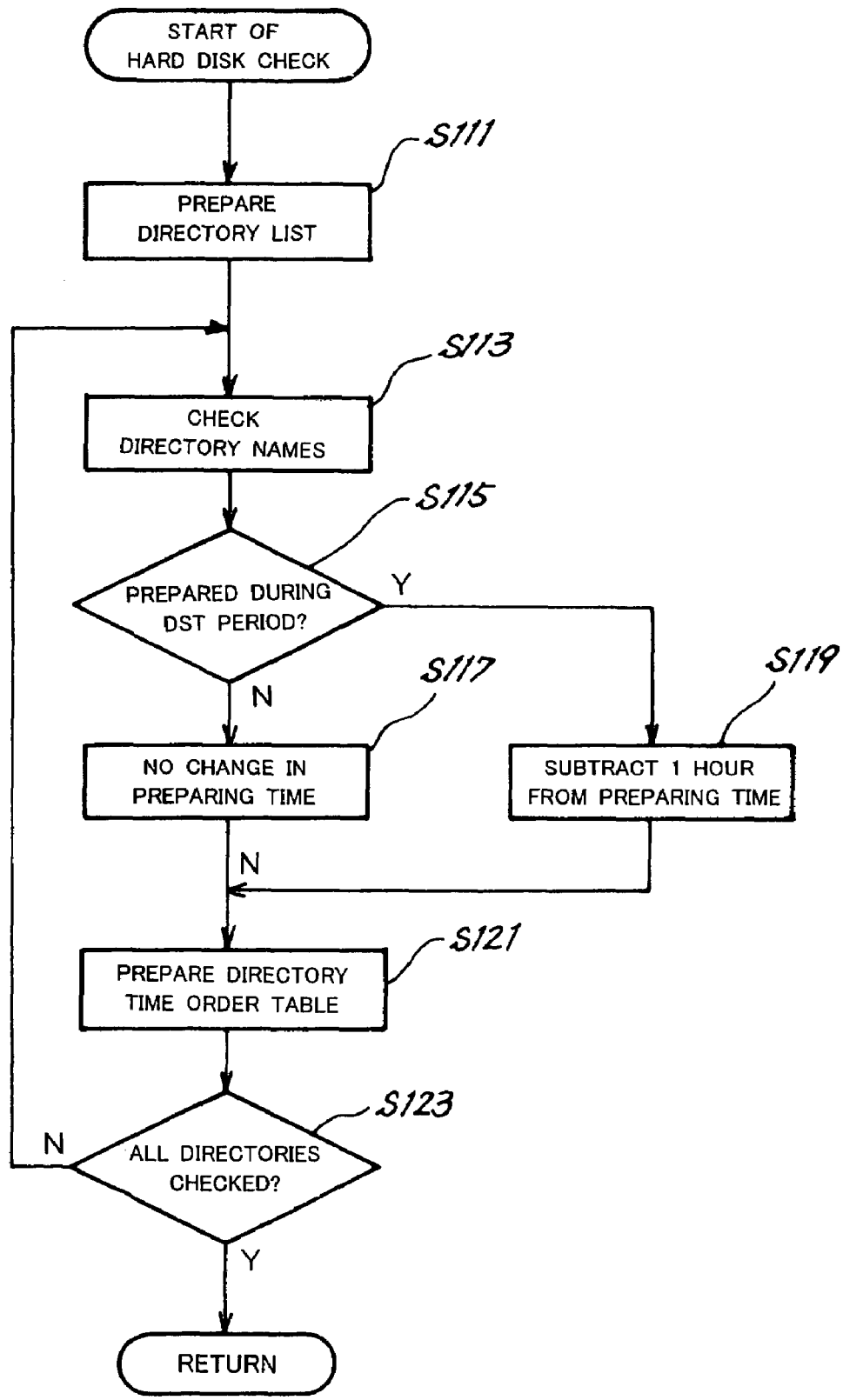
FIG. 8 is a flow chart showing a directory checking procedure of the monitoring camera device embodying the invention.
Figure 9:
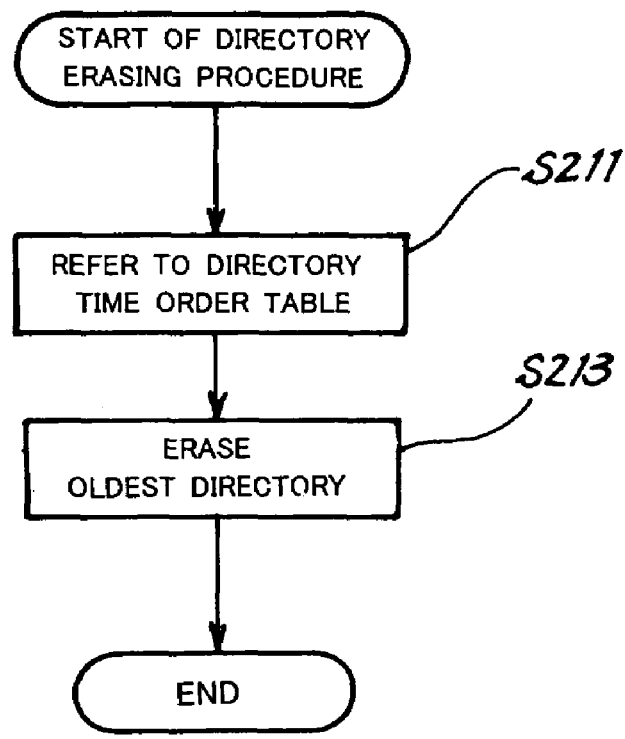
FIG. 9 is a flow chart showing a directory erasing procedure of the monitoring camera device embodying the invention.

FIG. 8 is a flow chart showing the checking procedure. First, a list of second directories existing in a recording area provided on the hard disk 7 for the usual recording mode is prepared by checking a file management region (FAT) of the hard disk 7 (S111). Next, reference is made to the names of second directories listed up (S112), and an inquiry is made as to whether each of the directories is prepared during the period of daylight saving time with reference to the last two digits in the names of the second directories (S113). When the last digits of the name are "00," the second directory concerned is found to have been prepared during the period of the standard time. The time indicated by the directory preparing time data of the second directory is adopted as it is as time data for preparing a directory time order table without changing the data (S117). On the other hand, if the last portion of the name of the second directory is "01," this indicates that the second directory concerned is prepared during the period of daylight saving time. The time correction value which is a value of time difference between the standard time and daylight saving time is subtracted from the second directory preparing time to obtain a time, which is adopted as time data for preparing the directory time order table (S119) In the illustrated case of FIG. 12, 1 hour is subtracted as the time correction value.

Next, the directory time order table is prepared with reference to the time data obtained in step S117 and/or step S119 (S121). In the case where the second directory is prepared during the period of daylight saving time as described above, the time obtained by subtracting the time correction value from the second directory preparing time is used for preparing the directory time order table in step S119, so that the table prepared is correct even if the preparing time indicated by the directory preparing time data as to the second directory prepared during the period of daylight saving time overlaps the preparing time indicated by like data as to the second directory prepared during the period of the standard time.

When steps S113 to S121 are performed for all the second directories given in the list prepared in step S111, the step S11 shown in FIG. 7, i.e., the procedure for checking the second directories on the hard disk 7 is completed (S123).

FIG. 7 will be referred to again. When step S11 is completed, an inquiry is made as to whether the memory buffer 21 has compressed image data not stored on the hard disk 7 (S13) If the memory buffer 21 has compressed image data not stored on the disk 7, step S17 and the following steps are performed, whereas if there is no compressed image data, step S29 and the following steps are performed (S15).

If the memory buffer 21 has the compressed image data remaining unstored on the hard disk 7 (S15), reference is made to the directory time order table prepared in step S121 (S17). An inquiry is then made as to whether the number of second directories below the first directory ("ALARM") is 12 (S19) When the number of second directories is 12, the real time OS of the CPU 11 is given a command to erase the second directory which is prepared earliest (S21). The real time OS given the command to erase the directory erases the second directory shown in FIG. 9. The oldest directory is specified (S211) with reference to the directory time order table, and is erased (S213). With the erasure of the second directory, the compressed image files contained therein are also erased.

On the other hand, if the number of second directories is found to be less than 12 in FIG. 7, step S19, the image capturing time data added to the compressed image data is referred to, and an inquiry is made as to whether the image capturing time is within the daylight saving time zone according to the standard time counted by the standard clock 19, namely as to whether the image capturing time is after the daylight saving time starting time as expressed in the standard time and before the daylight saving time ending time as expressed in the standard time (S23). Unless the image capturing time is within the daylight saving time zone, the real time OS of the CPU 11 is given a command to conduct a standard time recording operation. (S25). When the image capturing time is within the daylight saving time zone, the real time OS of the CPU 11 is given a command to conduct a daylight saving time recording operation (S27).

Figure 10:
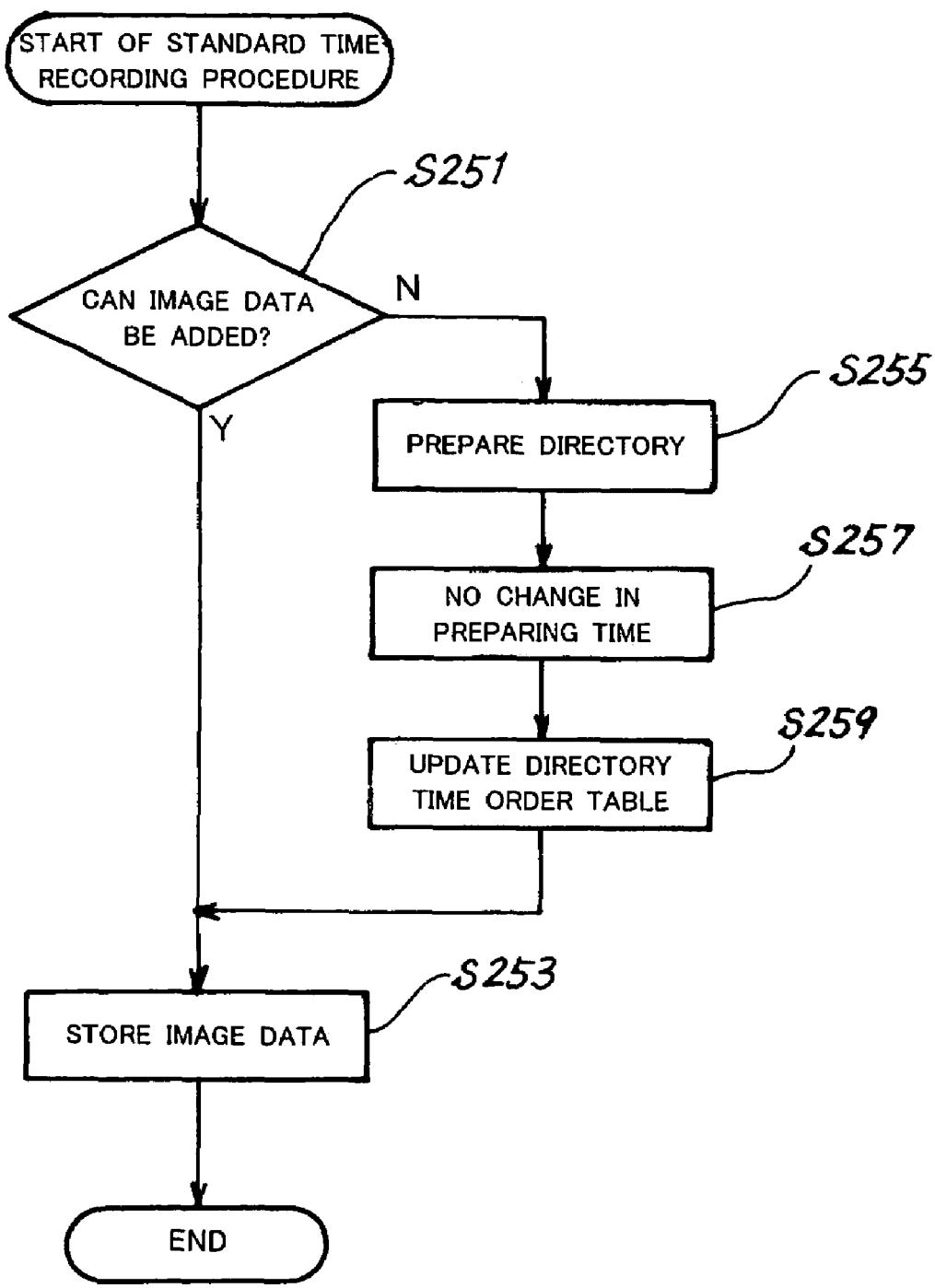
FIG. 10 is a flow chart showing a standard time recording procedure of the monitoring camera device embodying the invention.

FIG. 10 is a flow chart showing a standard time recording procedure. First, an inquiry is made as to whether the compressed image files under the second directory prepared last are less than 900 in number (S251). Thus, an inquiry is made as to whether a compressed image file can be added to the second directory. In the case where the number of compressed image files is less than 900, compressed image data can be stored on the hard disk 7 without preparing a new second directory (S253). The compressed image data is contained in the second directory which is prepared last, whereby the standard time recording procedure is completed.

When the compressed image files under the second directory prepared last are found to be 900 in number in step S251, a new second directory is prepared on the hard disk 7 with directory preparing time data added to the directory (S255). At this time, a name is given to the new second directory according to the naming rule described with reference to FIG. 5. Stated more specifically, the first number of the name is a value obtained by adding 1 to like number in the name of the second directory prepared last, and the last digits of the name are "00" (for example, "103ALARM00"). The time indicated by preparing time data added to the new second directory is used as it is without being changed as time data for preparing the time order table (S257). The directory time order table is updated so as to include information as to the second directory (S259), and the compressed image data is stored on the hard disk 7 so as to be positioned under the second directory (S253), whereby the standard time recording procedure is completed.

Figure 11:
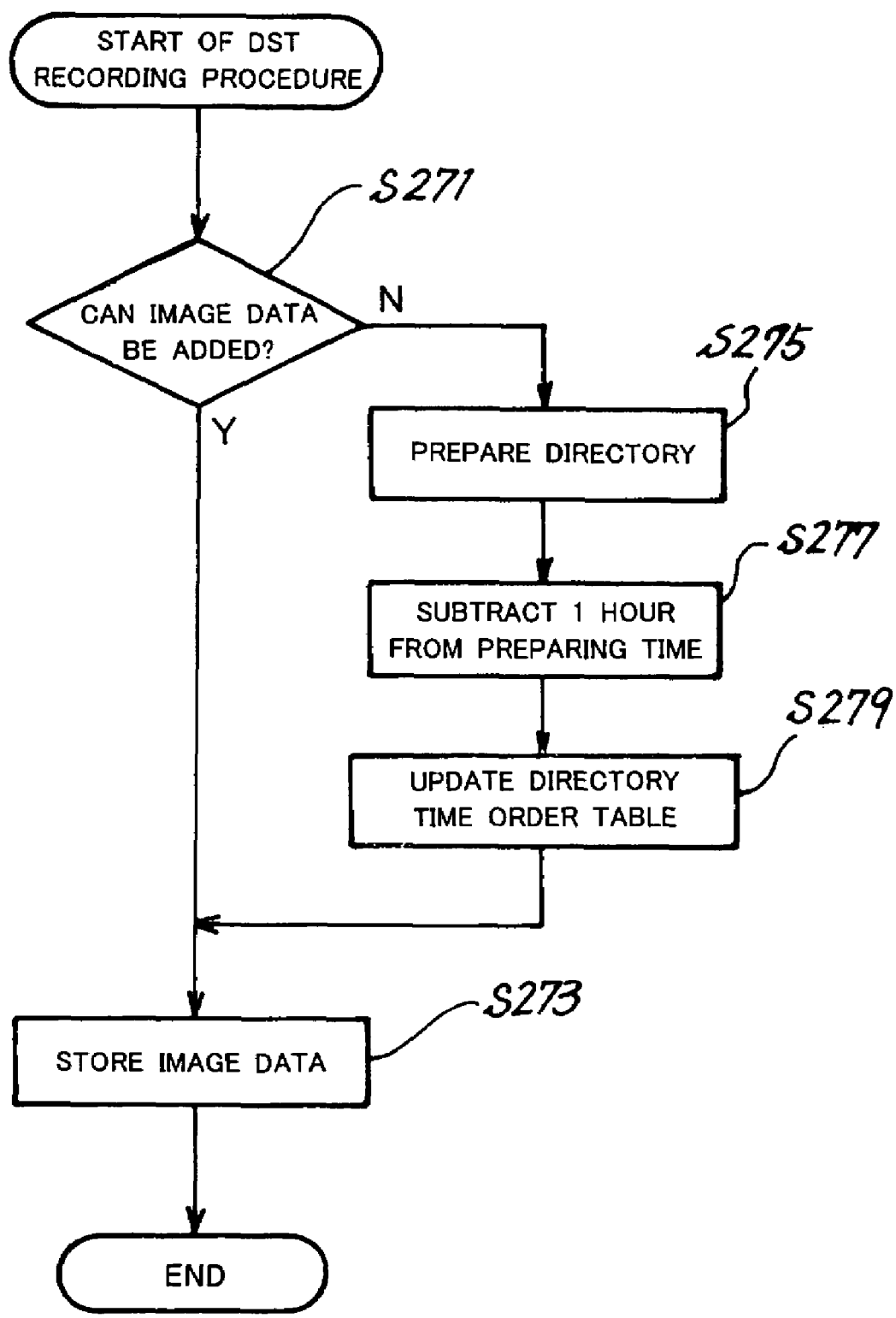
FIG. 11 is a flow chart showing a daylight saving time recording procedure of the monitoring camera device embodying the invention.

When the real time OS of CPU 11 is given the command to conduct a daylight saving time recording operation in step S27 of FIG. 7, on the other hand, this operation is performed as shown in FIG. 11. First, an inquiry is made as to whether the compressed image files under the second directory prepared last area less than 900 in number (S271). If the inquiry is answered in the affirmative, compressed image data is stored on the hard disk 7 so as to be contained under the second directory (S273), whereby the daylight saving time recording operation is completed.

When the compressed image files under the second directory prepared last are found to be 900 in number in step S271, a new second directory is prepared on the hard disk 7 with directory preparing time data attached to the directory (S275). At this time, the new second directory is named according to the naming rule described with reference to FIG. 5. Stated more specifically, the first number of the name is a value obtained by adding 1 to like number in the name of the second directory prepared last, and the last digits of the name are "01" (for example, "102ALARM01"). The time correction value is subtracted from the time indicated by preparing time data to obtain a value, which is used as time data for preparing the time order table (S277). The directory time order table is updated so as to include information as to the second directory (S279), and the compressed image data is stored on the hard disk 7 so as to be positioned under the second directory (S273), whereby the daylight saving time recording procedure is completed.

Reference is made to FIG. 7 again. The user manipulates manual buttons 25 after the above procedure to give a command to stop processing to the CPU 11 via the system controller 23, the storage of compressed image data to the hard disk 7 is completed. Unless the command to stop is given, the procedure of steps S13 and the following are performed repeatedly.

Although an embodiment of the present invention has been described above, the frame rate of 3 fps used for the image pickup unit, the hard disk used as an image data recording medium, the directory structure and names shown in FIG. 5 and used for the hard disk and the JPEG method of compression for use in recording image data, etc. are solely intended for the illustration of one embodiment of the invention and are not limitative to the invention.

The invention claimed is:

1. A monitoring camera device wherein image capturing time data is added to image data which is successive with respect to time, and the image data is stored on a recording medium, the monitoring camera device being characterized in that a plurality of directories are prepared on the recording medium for containing a predetermined number of items of image data, each of the directories being given a name according to a directory naming rule, wherein based on said naming rule, a portion of said name is different based solely on when the directory is prepared during the period of standard time versus when the directory is prepared during the period of daylight saving time.

2. A monitoring camera device according to claim 1 wherein each of the directories has attached thereto directory preparing time data indicating the time when the directory is prepared.

3. A monitoring camera device according to claim 2 which comprises a processing unit for judging whether each of the directories is prepared during the period of the standard time or during the period of daylight saving time with reference to the name of the directory, and judging the order of directory preparing times using the time indicated by the directory preparing data of the directory when the directory is found to have been prepared during the period of the standard time, or using a value obtained by subtracting a time correction value from the time indicated by the directory preparing data of the directory when the directory is found to have been prepared during the period of daylight saving time.

4. A monitoring camera device according to claim 3 which captures and records images while erasing the directory prepared earliest with reference to the result of judging the directory preparing time order.

5. An image data management method for a monitonng camera device for continually capturing and recording images by preparing a plurality of directories on a recording medium, adding image capturing time data to image data which is successive with respective to time and storing the image data under the directories, the image data management method comprising the steps of:

preparing directories each having a name given thereto and directory preparing time data attached thereto and indicating the time when the directory is prepared, a portion of the name being different based solely when the directory is prepared during the period of standard time versus when the directory is prepared during the period of daylight saving time, judging whether each of the directories is prepared during the period of the standard time or during the period of daylight saving time with reference to the name of the directory, judging the order of directory preparing times using the time indicated by the directory preparing data of the directory when the directory is found to have been prepared during the period of the standard time, or using a value obtained by subtracting a time correction value from the time indicated by the directory preparing data of the directory when the directory is found to have been prepared during the period of daylight saving time, and erasing the directory prepared earliest along with the image data under the earliest directory with reference to the result of judging the directory preparing time order in the case where the number of directors has reached an upper limit value.

6. A monitoring camera device, wherein image capturing time data is added to image data which is successive with respect to time, and the image data is stored on a recording medium, the monitoring camera device being characterized in that a plurality of directories are prepared on the recording medium for containing a predetermined number of items of image data, each of the directories being given a name according to a directory naming rule, wherein based on said naming rule, a portion of said name is defined solely depending on whether the directory is prepared during the period of standard time or the period of daylight savings time.

* * * * *

UNITED STATES PATENT AND TRADEMARK OFFICE
CERTIFICATE OF CORRECTION

PATENT NO. : 7,382,404 B2  Page 1 of 1
APPLICATION NO. : 10/476888
DATED : June 3, 2008
INVENTOR(S) : Yamamoto et al.

It is certified that error appears in the above-identified patent and that said Letters Patent is hereby corrected as shown below:

On the title page,

[*] Notice: Subject to any disclaimer, the term of this patent is extended or adjusted under 35 USC 154(b) by 793 days Delete the phrase "by 793 days" and insert -- by 781 days --

Signed and Sealed this

Seventeenth Day of March, 2009

JOHN DOLL
*Acting Director of the United States Patent and Trademark Office*